United States Patent

Kawabe et al.

[11] Patent Number: 5,683,049
[45] Date of Patent: Nov. 4, 1997

[54] BAIL MODE SWITCHING DEVICE FOR A SPINNING REEL

[75] Inventors: Yuzo Kawabe, Izumi; Yosuhiro Hitomi, Hashimoto; Seiichi Aratake, Izumi, all of Japan

[73] Assignee: Shimano Inc., Osaka, Japan

[21] Appl. No.: 646,541

[22] Filed: May 8, 1996

[30] Foreign Application Priority Data

May 9, 1995 [JP] Japan ................... 7-110928

[51] Int. Cl.⁶ .................................. A01K 89/01
[52] U.S. Cl. .................................. 242/232
[58] Field of Search ..................... 242/230, 231, 242/232, 233

[56] References Cited

U.S. PATENT DOCUMENTS

| | | |
|---|---|---|
| 4,095,756 | 6/1978 | Morishita . |
| 4,898,339 | 2/1990 | Takeuchi ................... 242/231 |
| 4,923,140 | 5/1990 | Yamaguchi et al. ........ 242/230 |
| 4,941,626 | 7/1990 | Carlsson ................... 242/231 |
| 5,261,628 | 11/1993 | Carlsson ................... 242/233 |
| 5,273,233 | 12/1993 | Sugawara ................... 242/232 |
| 5,312,067 | 5/1994 | Sugawara et al. .......... 242/232 |
| 5,348,245 | 9/1994 | Sugawara ................... 242/233 |

FOREIGN PATENT DOCUMENTS

| | | |
|---|---|---|
| 0 369 904 | 5/1990 | France . |
| 26 58 615 | 7/1977 | Germany . |
| 7-53494 | 8/1989 | Japan . |
| 2 257 004 | 1/1993 | United Kingdom . |
| 2257004 | 5/1993 | United Kingdom ........ 242/232 |

Primary Examiner—Katherine Matecki
Attorney, Agent, or Firm—Shinjyu Office of Patent Attorneys

[57] ABSTRACT

A bail mode switching device for a spinning reel which produces an audible sound when a bail on the spinning reel switches between a line reeling mode and and a line casting mode. The bail mode switching device includes at least one toggle spring mechanism which switches the bail between modes, and an audible warning mechanism which can produce a distinctive sound when the bail mode both commences and completes a bail mode change.

9 Claims, 12 Drawing Sheets

BAIL MODE SWITCHING DEVICE FOR A SPINNING REEL

BACKGROUND OF THE INVENTION

A. Field of the Invention

The invention relates to a bail switching device for a spinning reel. More particularly, it relates to a bail switching device which alerts a user of the spinning reel when the bail is switched between the line casting and the line reeling modes.

B. Description of the Related Art

A spinning reel typically includes a reel main body, a rotor rotatably supported by the reel main body, and a spool supported by the reel main body. Fishing line is wound around the outer periphery of the spool.

The rotor includes two rotor arms, two bail support members, a bail, a line roller, and a bail mode switching device. The two rotor arms extend along the axis of rotation of the rotor and are disposed on opposing sides thereof. Each rotor arm supports a bail support member, and a bail and a line roller for guiding the fishing line around the spool are supported by both bail support members.

The bail support members pivot with respect to the rotor arms. When the user desires to reel in the fishing line, the bail and the two bail support members are placed into a line reeling mode. When the user desires to cast out the fishing line, the bail and the two bail support members are placed into a line casting mode.

The bail mode switching device allows the bail to be shifted between the line reeling and the line casting modes. The bail mode switching device also includes a toggle mechanism which automatically returns the bail from the line casting mode to the line reeling mode when the rotor is rotated by the handle.

However, the prior art spinning reels do not allow the user to accurately and easily determine which mode the bail is in at any given time, or whether the bail is securely seated in the line reeling or line casting modes. This is partially due to the fact that the sounds created by the spinning reel when the bail mote changes are indistinct, i.e. other parts of the spinning reel make the same or very similar sounds during operation. It is therefore difficult for a fisherman to reliably determine which mode the bail is in without carefully examining it. In fact it may be possible for a fisherman to hear a sound that he believes indicates a successful bail mode change, when in fact it is sound emanating from another part of the reel. For example, if the user mistakenly believes that the bail is in the line reeling mode when in fact it is in the line casting mode, the user will not be able to quickly set the hook into a fish that suddenly takes the bait or lure on the end of the fishing line. The same will be true if the bail appears to be in the line reeling mode, but suddenly shifts back to the line casting mode because it was insecurely seated. In addition, if the user mistakenly believes that the bail is in the line casting mode when in fact it is in the line reeling mode and attempts to cast the fishing line out, the fishing line may spin around the end of the fishing rod and become tangled.

SUMMARY OF THE INVENTION

It is an object of the present invention to alert the user of a spinning reel when the bail has switched modes by producing a distinct and audible sound.

According to one aspect of the present invention, a bail mode switching device for a spinning reel includes a rotor rotatably supported on a spinning reel main body, the rotor including first and second arm portions and first and second bail support members pivotably supported at an end of each of the first and second arm portions, a bail fixed to both the first and second bail support members, a toggle spring mechanism for switching the bail into a line reeling mode and a line casting mode, and an audible warning mechanism, the audible warning mechanism producing a sound when the bail switches between line reeling and line casting modes.

According to another aspect of the present invention, the toggle spring mechanism urges the bail to change modes when the bail and the first and second bail support members are pivoted to a intermediate position.

According to yet another aspect of the present invention, the audible warning mechanism produces a sound when the bail has completed a bail mode change.

According to yet another aspect of the present invention, the audible warning mechanism produces a sound when the bail commences a bail mode change.

According to yet another aspect of the present invention, the audible warning mechanism produces a sound when the bail commences a bail mode change and completes a bail mode change.

According to yet another aspect of the present invention, the audible warning mechanism forms a part of the toggle spring mechanism.

According to yet another aspect of the present invention, the audible warning mechanism further includes an active member which pivots during a bail mode change, a passive member which remains stationary during a bail mode change, sound producing members disposed on the active member and the passive member. The sound producing members are urged toward one another and produce a sound when the active member is pivoted to the line reeling or the line casting modes.

According to yet another aspect of the present invention, the toggle spring mechanism is disposed within an interior of the first or second arm portions, and the audible warning mechanism forms a part of the toggle spring mechanism.

According to yet another aspect of the present invention, the toggle spring mechanism further includes a first toggle spring mechanism which includes a first tubular member, and a second toggle spring mechanism which includes a notch which engages with the first tubular member. The first tubular member and the notch strike each other and create an audible sound when a bail mode change has been completed.

Other objects, features, aspects and advantages of the present invention will be apparent from the following detailed description of the present invention when taken in conjunction with the accompanying drawings, in which like reference numerals designate the same or similar parts throughout.

DETAILED DESCRIPTION OF THE PREFERRED EMBODIMENTS

Figure 1:
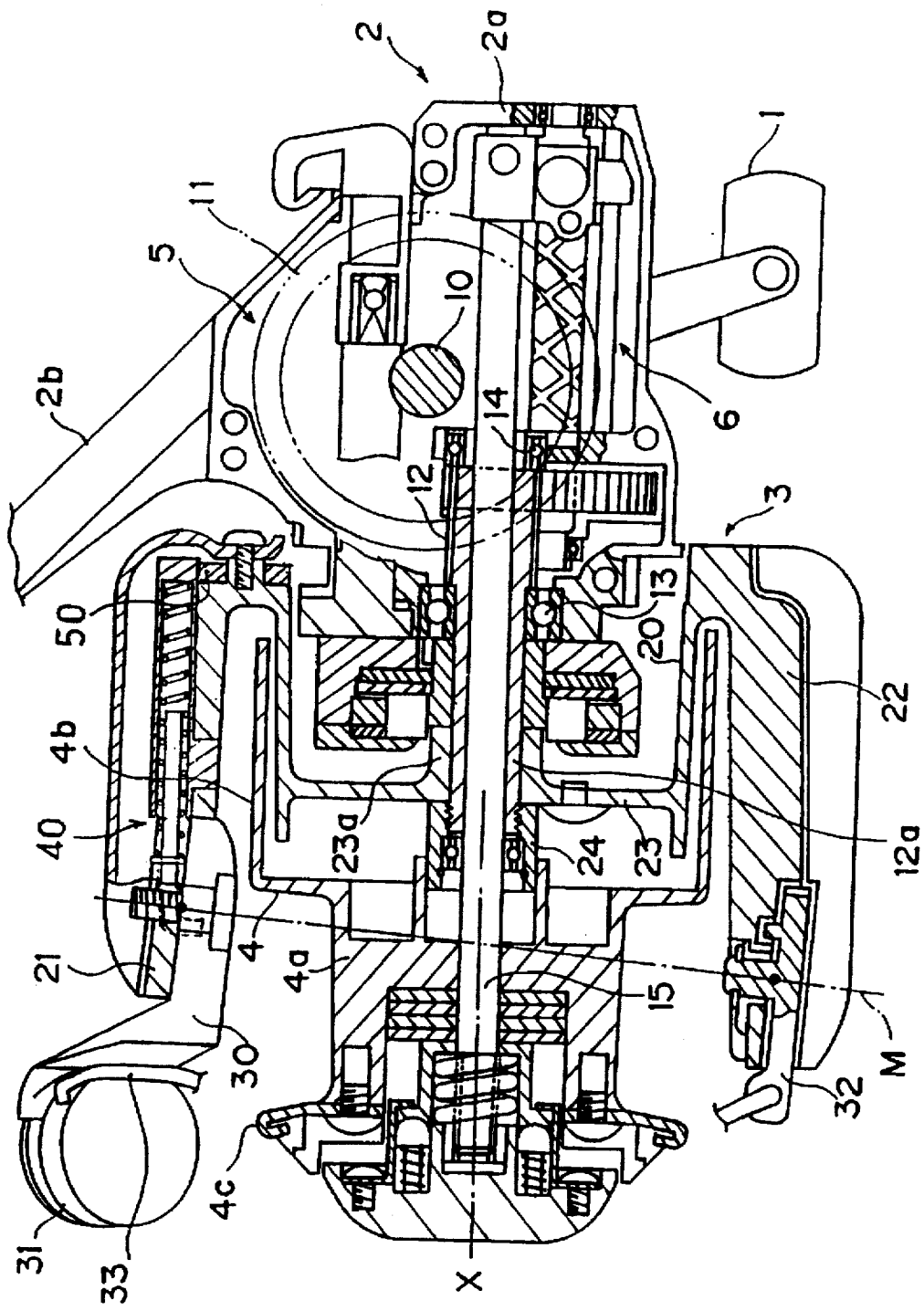
FIG. 1 is a fragmentary, part section, part elevation of a spinning reel having a reel main body and a rotor with a bail mode switching device according to one embodiment of the present invention.

A spinning reel according to one aspect of the present invention is shown in FIG. 1, and includes a reel main body 2, a body 2a, a rotor 3 rotatably supported by the reel main body 2, and a spool 4 supported by the reel main body 2. A rotor drive mechanism 5 and a reciprocating mechanism 6 are disposed in the interior of the body 2a. The rotor drive mechanism 5 is geared to cause the rotor 3 to rotate, and the reciprocating mechanism 6 engages the spool 4 causing it to reciprocate along a first axis X, thus allowing fishing line to be wound around the outer periphery of the spool 4. A handle shaft 10 is rotatably supported by the reel main body 2, and a handle 1 is attachable to an end portion of handle shaft 10. An attachment portion 2b is formed on the body 2a for attaching the spinning reel to a fishing rod (not shown).

The rotor drive mechanism 5 includes a face gear 11 that is connected to and rotates together with the handle shaft 10, and a pinion gear 12 which engages with the face gear 11.

The pinion gear 12 is hollow and cylindrical in shape and defines a rotor shaft, and a first end portion 12a thereof is connected to and extends through the rotor 3. The portion of the first end portion 12a that extends through the rotor 3 is provided with a threaded portion. The pinion gear 12 is rotatably supported by the reel main body 2 via a ball bearing assembly 14 disposed on an end portion thereof.

The rotor 3 includes a generally cylindrical portion 20, a first arm portion 21 and a second arm portion 22. The cylindrical portion 20 and both first and second arm portions 21 and 22 are formed integral with each other, with the first and second arm portions 21 and 22 being disposed on the outer portion of the cylindrical portion 20 and in a generally opposing relationship.

A wall 23 is formed on a first end of the cylindrical portion 20, and a boss 23a is formed in the center of the wall 23. A through-hole is formed in the center of the boss 23a, and the first end portion 12a of the pinion gear 12 penetrates the through-hole. A nut 24 is disposed on the outer portion of cylindrical portion 20 and aligned with the through-hole formed therein. A first end portion of the nut 24 is screwed together with the threaded portion of the first end portion 12a of the pinion gear 12, thereby securing the rotor 3 to the pinion gear 12. A second ball bearing assembly 13 supports an intermediate portion of the pinion gear 12.

A first bail support member 30 is pivotably attached to the inner peripheral side of the first arm portion 21. A line roller 31 is disposed on a first end of the first bail support member 30 for guiding the fishing line around the spool 4. A second bail support member 32 is pivotably attached to the inner peripheral side of the second arm portion 22. A bail 33 is disposed between the line roller 31 on the first bail support member 30 and the second bail support member 32. Both first and second bail support members 30 and 32 pivot on an second axis M, which is slanted with respect to the first axis X.

The bail mode switching device will now be described.

As shown in FIGS. 2–5, the bail mode switching device includes a first toggle spring mechanism 40 disposed within the first arm portion 21, a second toggle spring mechanism 41 disposed on the base of the rotor 3 and generally below the first toggle spring mechanism 40, and a switching member 42 fixed to the reel body 2a.

Figure 4:
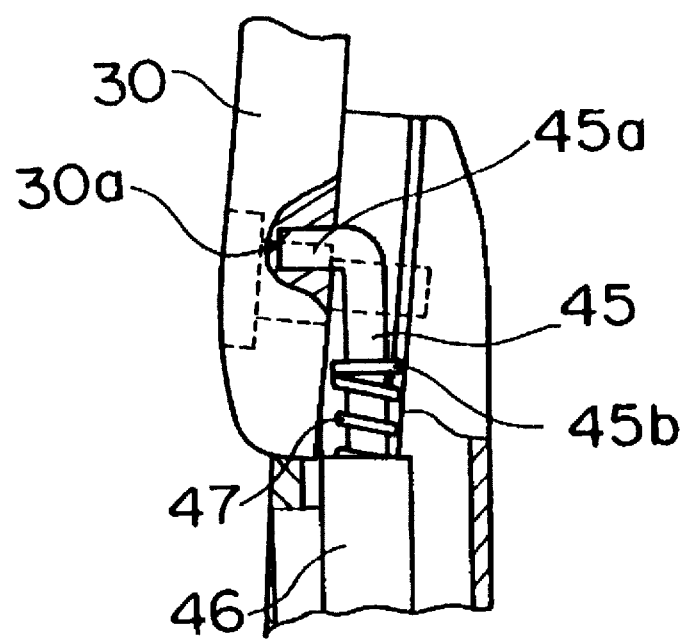
FIG. 4 is a fragmentary, part cross-sectional side view of the first bail support member and the first arm portion depicted in FIG. 1, showing the first toggle mechanism engaged with the first bail support member.

The first toggle spring mechanism 40 includes a first rod 45, a first tubular member 46 which supports a rear section of the rod 45 therein, and a first spring 47 disposed inside the first tubular member 46 which urges the first rod 45 outward. As shown in FIG. 4, the first rod 45 includes a curved first end 45a which engages with a hole 30a formed in the first bail support member 30. A retainer 45b is formed on the first rod 45, and a front end of the first spring 47 abuts the retainer 45b. A stopper 21a is formed on an upper interior portion of the first arm portion 21. The first tubular cylindrical member 46 is pivotably attached to an inner wall of the first arm portion 21, and pivots around a third axis A.

Figure 2:
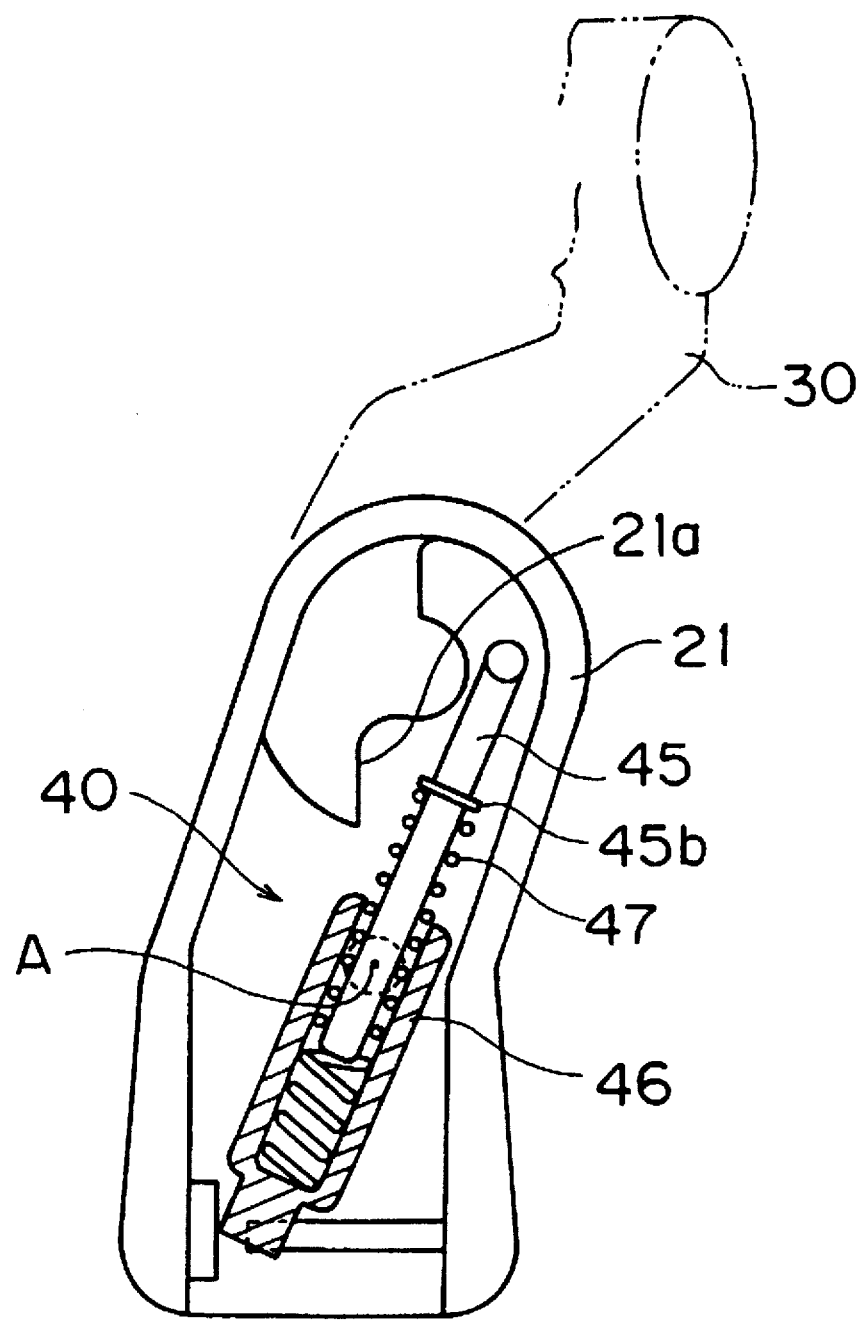
FIG. 2 is a front cutaway view of the interior of a first arm portion of the spinning reel depicted in FIG. 1, showing a part cross-section of a first toggle mechanism configured in a line reeling mode.
Figure 3:
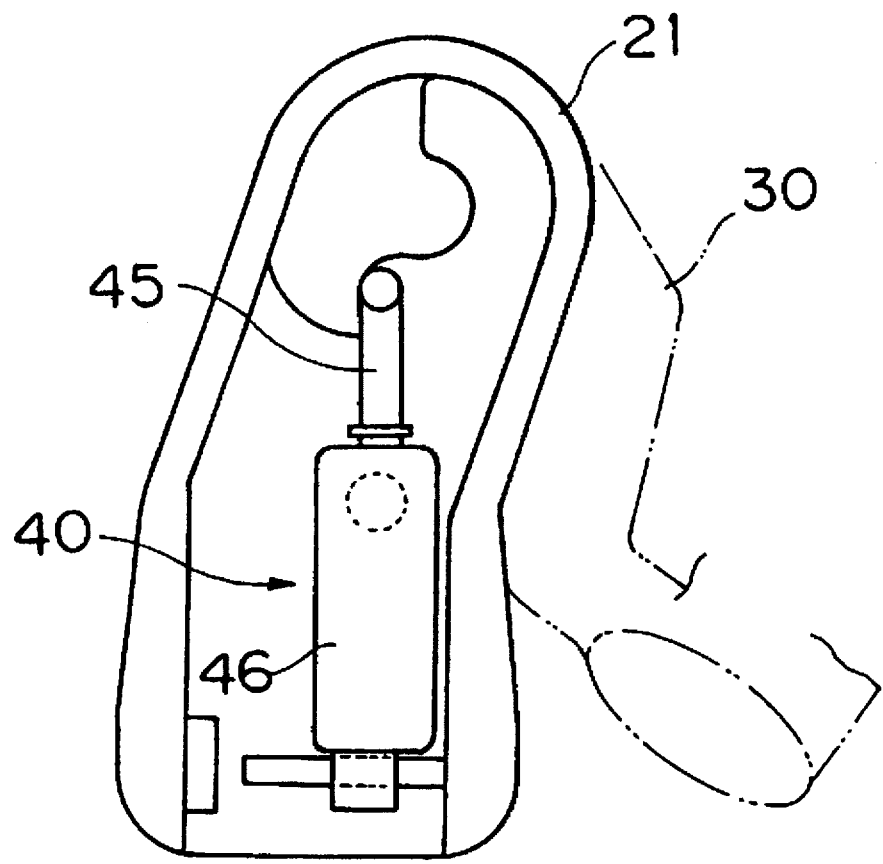
FIG. 3 is a front cutaway view of the interior of the first arm portion depicted in FIG. 2, showing a first toggle mechanism configured in a line casting mode.

The first toggle spring mechanism 40 with a structure of this type may be placed into a first position as shown in FIG. 2, and a second position as shown in FIG. 3. The first position corresponds to a line reeling mode, and the second position corresponds to a line casting mode.

Figure 5:
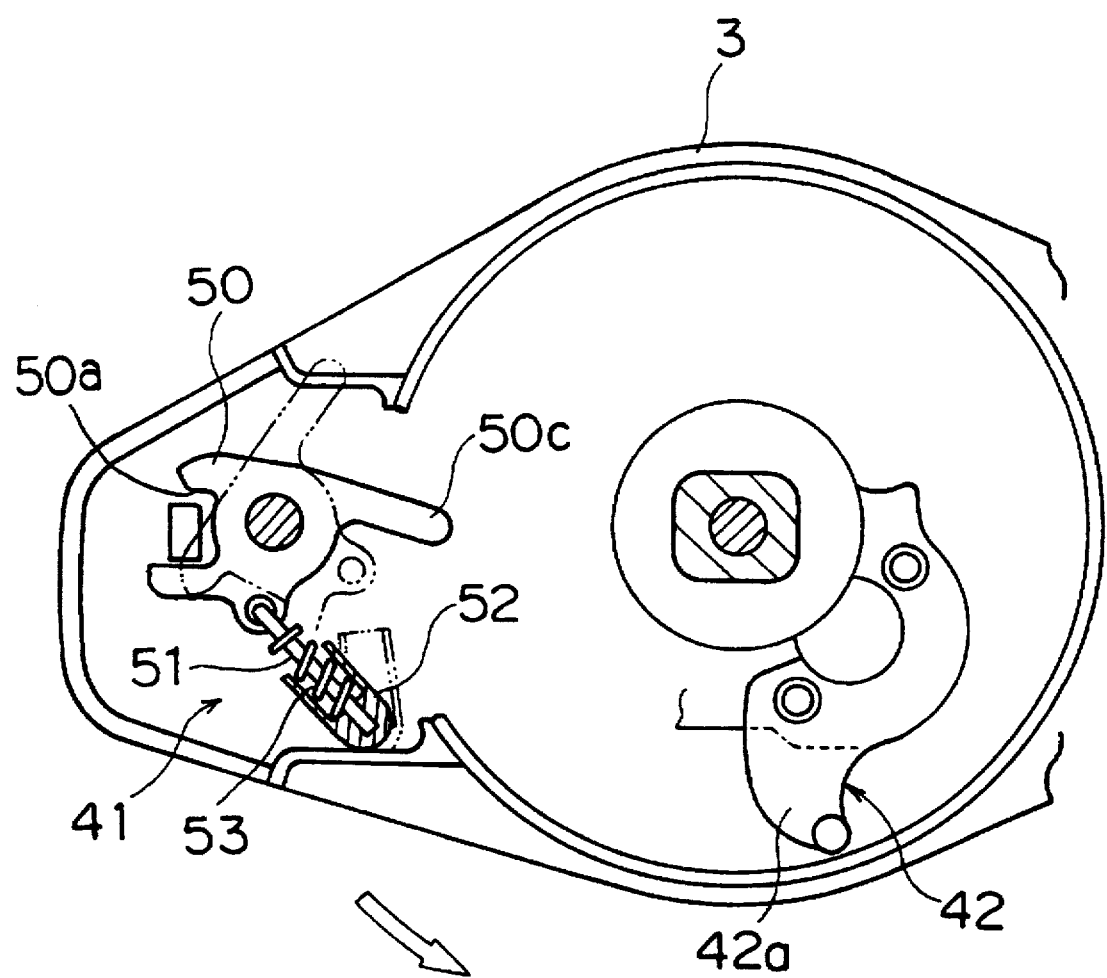
FIG. 5 is a cross-sectional plan view of the spinning reel depicted in FIG. 1, showing a lower portion of the rotor, a second toggle mechanism and a switching member.
Figure 6:
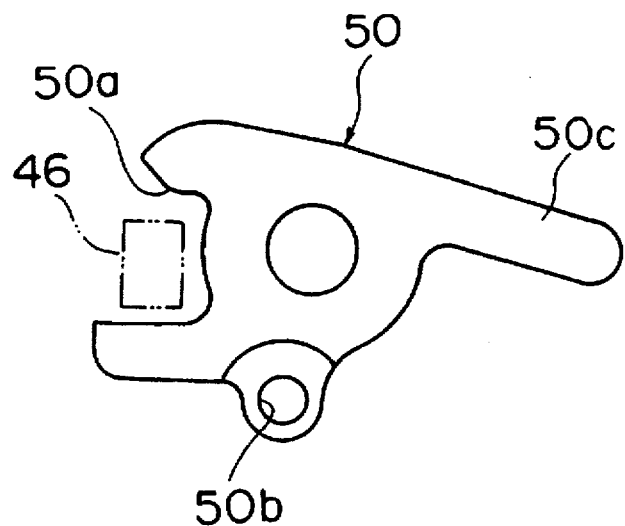
FIG. 6 is a plan view of a lever of the second toggle mechanism depicted in FIG. 5.

As can be seen in FIG. 5, the second toggle mechanism 41 includes a lever 50 pivotably attached to a lower inner portion of the rotor 3, below the first toggle mechanism 40. The second toggle mechanism further includes a second tubular member 52, a second rod 51 that includes a first end engaged with the lever 50 and a second end disposed inside the second tubular member 52, and a second spring 53 which urges second rod 51 toward lever 50. The second rod 51, the second tubular member 52, and the second spring 53 move in a plane parallel to the plane of rotation of the rotor. As shown in FIG. 6, the lever 50 includes a notch 50a which engages with a lower portion of the first tubular member 46, a rod engagement hole 50b, and a first projection 50c.

The lever 50 can adopt a first position shown in broken lines, and a second position shown in solid lines. The first position corresponds to the first position of the first toggle spring mechanism 40 (the line reeling mode of the bail 33), and the second position corresponds to the second position of the first toggle mechanism 40 (the line casting mode of the bail 33).

The switching member 42 is fixed to the reel body 2a and includes a second projection 42a, which projects up toward the rotor 3. When the lever 50 is placed in the second position and is rotated together with the rotor 3 in the direction shown in FIG. 5, the second projection 42a will come into contact with the first projection 50c of the lever 50 and push the lever 50 over to the first position.

The bail mode switching operation will now be described.

When the user desires to wind the fishing line onto the spool 4, the bail 33 is placed into the line reeling mode. As shown in FIGS. 1 and 2, the first bail support member 30 and the second bail support member 32 are moved to a generally upright position, the first tubular member 46 is pivoted in a clockwise direction (in FIG. 2), and the first rod 45 is both pulled and urged out of the first tubular member 46. The lever 50 is moved into the first position. The first projection 50c is retracted such that it cannot come into contact with the second projection 42a.

As can be seen in FIG. 3, when the user desires to place the bail 33 into the line casting mode, the first bail support member 30 and the second bail support member 32 are lowered to the position shown. The first cylindrical member 46 is pivoted in an counter-clockwise direction (in FIG. 3) around the second axis A, and this movement pivots the lever 50 in a clockwise direction (in FIG. 5) to the second position.

When the bail 33 is in the line casting mode, and the user desires to reel the fishing line in (i.e., switch the bail 33 to the line reeling mode), the lever 50 and the rotor 3 must be rotated in an counter-clockwise direction (in FIG. 5) by means of the handle 1. When this occurs, the first projection 50c will impact with the second projection 42a, and lever 50 will be pushed over and switched to the first position. In addition, the first cylindrical member 46 will be switched from the second position shown in FIG. 3 to the first position shown in FIG. 2 by lever 50. As a result, the first bail support member 30 and the second bail support member 32 will be switched over to the line reeling mode, assisted by the urging force of the first spring 47 and the second spring 53.

Because the second toggle spring mechanism 41 rotates in a plane parallel to the rotation of the rotor 3, the force generated by the rotation of the rotor 3 can be transmitted efficiently to the first toggle spring mechanism. As a result, the user need only apply a small force to the handle 1 in order to switch from the line casting mode to the line reeling mode.

The audible warning mechanism will now be described.

The first cylindrical member 46 and the lever 50 are prevented from prematurely switching from the line reeling to the line casting mode because of the forces applied by the first and second springs 47 and 53. However, once the switch-over process from the line reeling to the line casting mode has passed through the halfway point, the first and second springs 47 and 53 act to urge the first tubular member 46 and the lever 50 over to the line casting mode.

Because of the way in which the first toggle spring mechanism 40 and the second toggle spring mechanism 41 are arranged and the urging forces that they apply during bale mode switching, a displacement occurs between the first tubular member 46 and the lever 50 when the lever 50 is pushed over into the line casting mode by the first tubular member 46. In other words, the first tubular member 46 and the lever 50 do not move in unison during the bale switch-over.

As a result, a gap is created between the first tubular member 46 and the lever 50 during the switch-over to the line casting mode. When the lever 50 reaches the second position, the first tubular member 46 strikes the lever 50 and generates a sound loud enough to be audible to the user.

A powerful impact between the first tubular member 46 and the lever 50 occurs because the first tubular member 46 and the lever 50 move at considerable speed due to the urging forces generated by the first and second toggle spring mechanisms 40 and 41. As a result a loud sound is created, thereby alerting the user that the position of the bail 33 has changed.

The urging forces that help create the audible sounds during the switch-over from the line reeling to the line casting mode, also help create audible sounds during the switch-over from the line casting to the line reeling mode.

Figure 7:
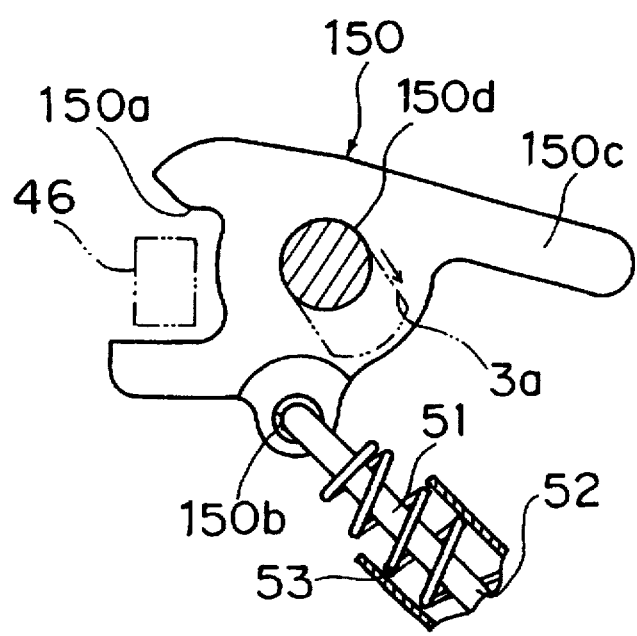
FIG. 7 is a plan view of a lever in a second toggle spring mechanism according to another embodiment of the present invention.

FIG. 7 shows a second embodiment of the second toggle spring mechanism 41. In this embodiment, a groove 3a is formed in the lower side of a lever 150, and this groove 3a engages with a pivot pin 150d. When the second projection 42a contacts a first projection 150c on the lever 150 during the switch-over to the line reeling mode, the pivot pin 150d moves toward the end of the groove 3a (in the direction indicated by the arrow in FIG. 7). When the pivot pin 150d abuts the end of the groove 3a, and additional force is applied, the lever 150 pivots over to the line reeling mode. In this embodiment, when the bail 33 is in the line casting mode, it will not easily switch back into the line reeling mode if it accidently strikes another object. This configuration allows the bail 33 to be maintained in the line casting mode until the user rotates the rotor 3, but requiring the user to apply very little force to switch the bail 33 to the line reeling mode.

Figure 8:
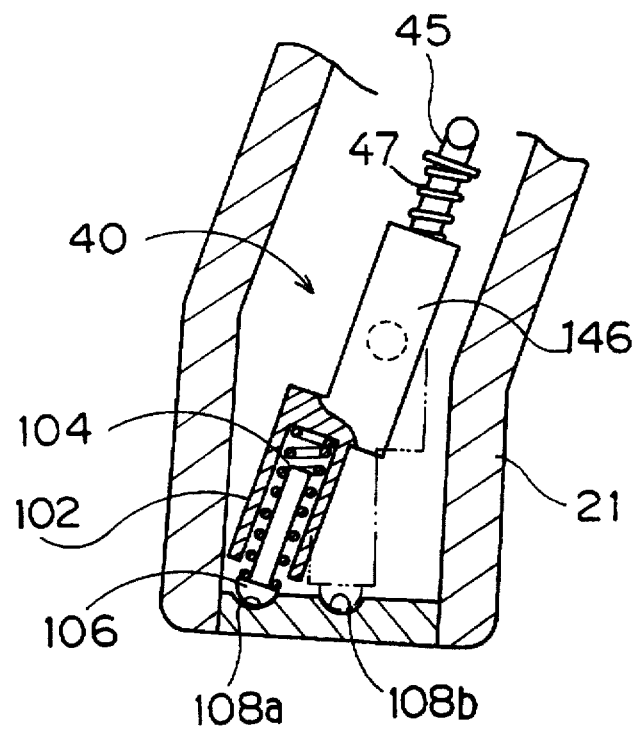
FIG. 8 is a fragmentary, cross-sectional front view of an interior of a first arm portion of a spinning reel, and a part cross-sectional view of a first toggle mechanism, according to yet another embodiment of the present invention.

In another embodiment shown in FIG. 8, an audible warning mechanism is provided on a first toggle mechanism 140. Like the first toggle mechanism 40, the first toggle mechanism 140 includes a first rod 45 and a first spring 47. In addition, the first toggle mechanism 140 includes a upper tubular portion 146 in which the first rod 45 and the first spring 47 are partially disposed, and a lower tubular portion 102 which is formed in an L-shape. A third spring 104 and a sounding pin 106 are partially disposed in the lower tubular portion 102. The sounding pin 106 includes a tip which is formed into a hemisphere.

On an inner wall surface of the first arm portion 21 opposite sounding pin 106, a first sounding hole 108a and a second sounding hole 108b are formed which correspond to the shape of the tip of the sounding pin 106. The first sounding hole 108a is provided in the place where the tip of the sounding pin 106 is positioned when the bail is in the line reeling mode. The second sounding hole 108b is provided in the place where the tip of the sounding pin 106 is positioned when the bail is in the line casting mode.

When the first toggle spring mechanism 140 pivots between the line reeling mode and the line casting mode, the head of the sounding pin 106 shifts between the respective first and second sounding holes 108a and 108b. When sounding pin 106 drops into either one of the first or second sounding holes 108a or 108b, the impact between tip of the sounding pin 106 and the walls of the respective sounding holes creates a audible sound, thereby alerting the user that the bail mode has changed.

Figure 9:
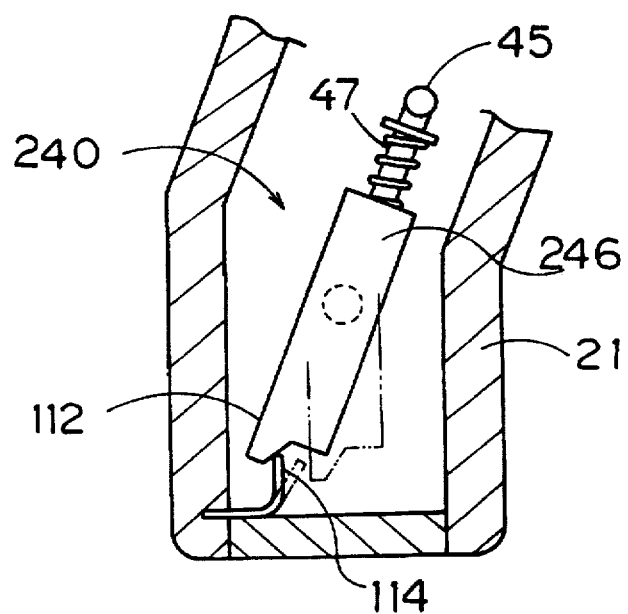
FIG. 9 is a fragmentary, cross-sectional front view of an interior of a first arm portion of a spinning reel, and a first toggle mechanism and a leaf spring according to yet another embodiment of the present invention.

In another embodiment of the present invention shown in FIG. 9, an audible warning mechanism is provided between a first tubular member 246 and the first arm member 21.

A lower portion of the first tubular member 246 is provided with a sounding projection 112, and the inner wall surface of the first arm portion 21 includes a sounding leaf spring 114. The sounding leaf spring 114 is formed in an L-shape, and its tip is positioned in the pivot path of the sound projection 112.

When the first tubular member 246 pivots during a bail mode switch, the sound projection 112 strikes against sounding leaf spring 114 and displaces it. When the first tubular member 246 pivots further, the sounding leaf spring 114 returns to its original position with its own elastic force, at which time it vibrates and generates an audible sound. It should be noted that it is possible to place the sounding leaf spring 114 on the first tubular member 146, and to place the sound projection 112 on the inner wall of the first arm portion 21.

The sound leaf spring 114 generates a sound when the bail mode switch-over has begun or ended, thereby giving the user an audible warning of its commencement or completion.

Figure 10:
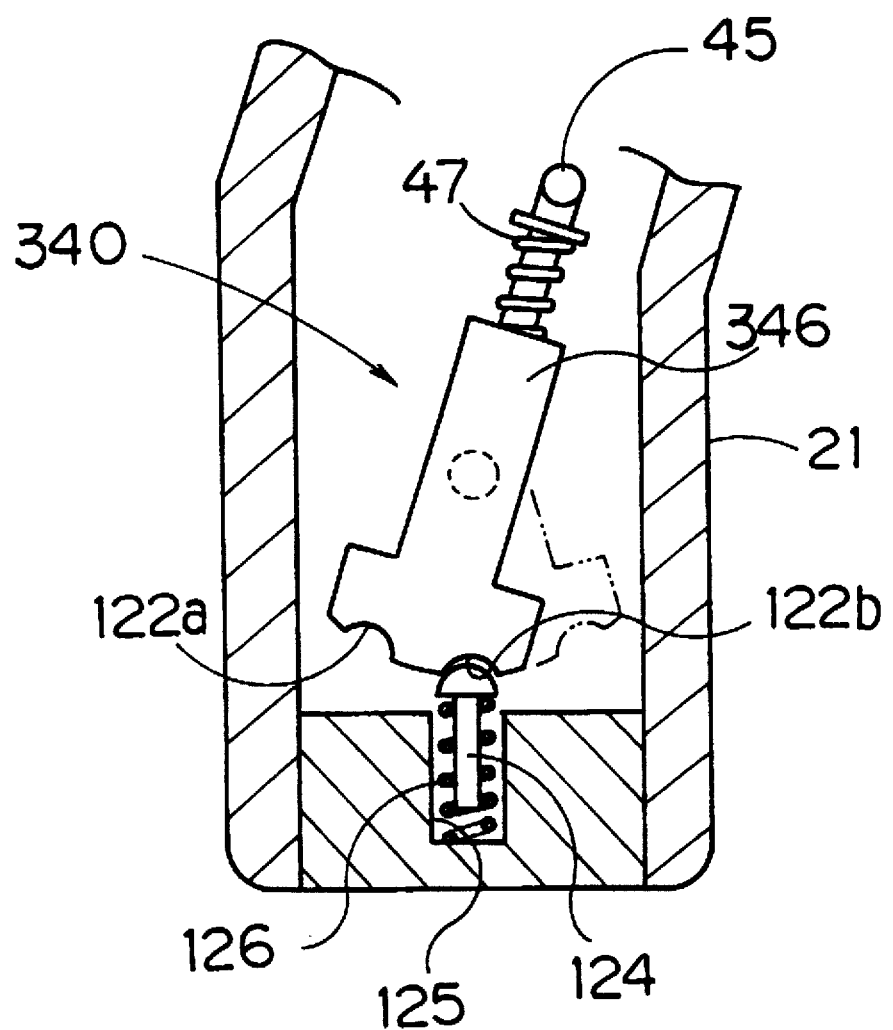
FIG. 10 is a fragmentary, cross-sectional view of an interior of a first arm portion of a spinning reel, and a first toggle mechanism and a sounding pin according to yet another embodiment of the present invention.

In yet another embodiment of the present invention shown in FIG. 10, an audible warning mechanism is provided between a first tubular member 346 and the first arm member 21.

A lower portion of the first tubular member 346 is generally arcuate in shape, and includes two hemispherical sounding holes 122a and 122b. A hole 125 is formed in an inner wall of first arm portion 21, and a sounding pin 124 and a third spring 126 are partially disposed in the hole 125, with the sounding pin 124 including a hemispherical tip.

When the first tubular member 346 pivots during the bail mode switch-over, the tip of the sounding pin 124 will drop into either one of the sounding holes 122a or 122b. Because the tip of the sounding pin 124 urged by the fourth spring 126, the tip will strike the walls of the sounding holes 122a or 122b, thereby generating an audible warning each time the bail mode is switched.

Figure 11A:
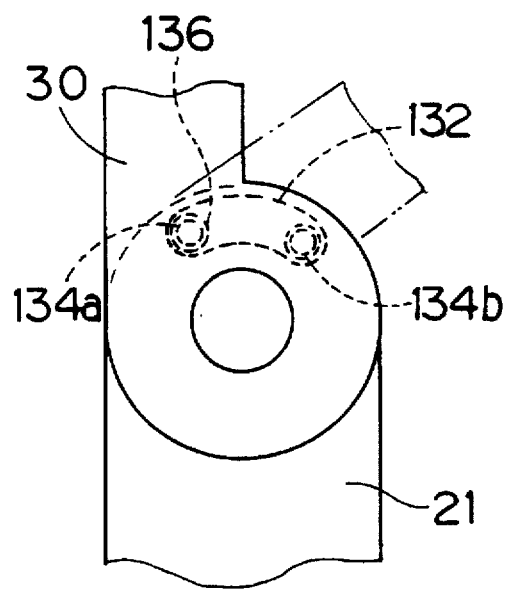
FIG. 11(a) is a fragmentary, frontal view of a first arm portion and first bail support member according to yet another embodiment of the present invention.
Figure 11B:
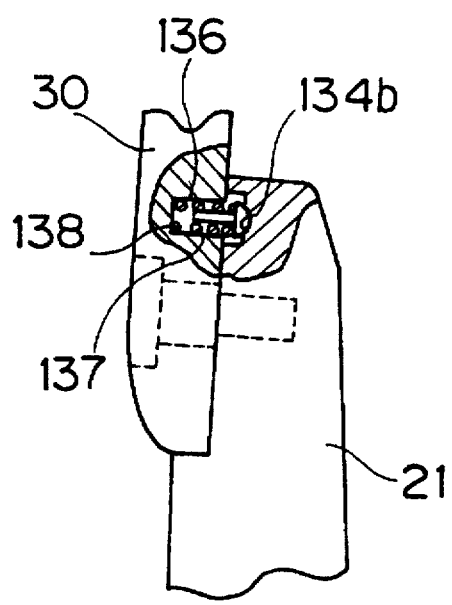
FIG. 11(b) is a fragmentary, part cross-sectional side view of the first arm portion and the first bail support member depicted in FIG. 11(a)

FIG. 11 shows yet another embodiment of the present invention, in which an audible warning mechanism is provided in opposing positions on the first arm portion 21 and the first bail support member 30.

In this embodiment, the first bail support member 30 further includes a sounding pin 136, a hole 137 and a third spring 138 which have structures similar to those shown in previous embodiments. The tip of the sounding pin 136 is urged by the fifth spring 138 so as to project toward the first arm portion 21.

The first arm portion 21 further includes a groove 132, which is semi-circular in shape and is cut into the surface of the first arm portion 21 to correspond with the pivot arc of first arm portion 21 and first bail support member 30. Two hemispherical sounding holes 134a and 134b are provided near both ends of the groove 132. It should be noted that it is possible to place the sounding pin 136 on the first arm portion 21, and to place the sounding holes 134a and 134b on the first bail support member 30.

When the first bail support member 30 pivots relative to the first arm portion 21, the sounding pin 136 moves within the groove 132 and drops into either one of the sounding holes 134a or 134b. When this occurs, the tip of the sounding pin 136 emits an audible sound when it strikes the walls of the sounding holes 134a or 134b. As with the previous embodiments, this gives the user an audible warning of a bail mode shift.

Figure 12:
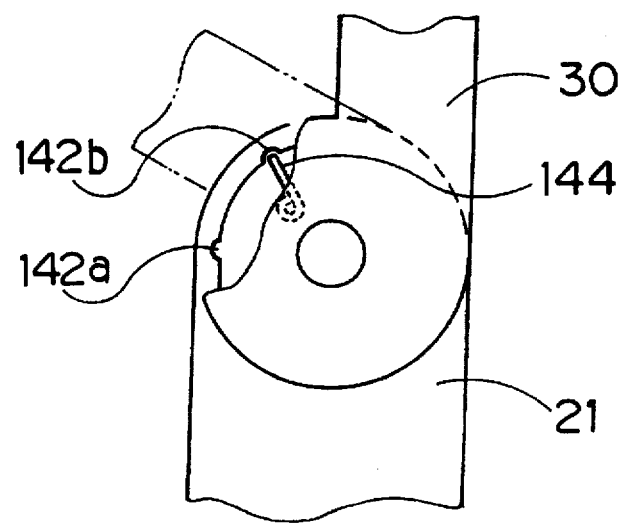
FIG. 12 is a fragmentary, part cutaway, frontal view of a first arm portion and a first bail support member according to yet another embodiment of the present invention.

FIG. 12 shows yet another embodiment of the present invention, in which an audible warning mechanism is provided in opposing positions on the first arm portion 21 and the first bail support member 30.

In this embodiment, the first bail support member 30 is provided with a sounding leaf spring 144 which extends radially outward from the axial center thereof. The first arm portion 21 is provided with sounding holes 142a and 142b disposed on an inner wall thereof, and along the path that a tip of the sound leaf spring 144 passes through during bail mode switch-over. The positions of sound leaf spring 144 and sounding holes 142a and 142b are configured so that the tip of the sound leaf spring 144 may be positioned within the sounding holes 142a and 142b when the bail 33 is in the line casting mode or in the line reeling mode.

When the first bail support member 30 pivots with respect to the first arm portion 21, the sound leaf spring 144 slides along the inner wall of first arm 21 and enters either one of the sounding holes 142a or 142b. When this occurs, the sound leaf spring 144 vibrates with its own elastic return force when it strikes the walls of the sounding holes 142a or 142b and emits an audible sound. As with the other embodiments of this invention, this sound acts as an audible warning that the bail mode has switched.

Figure 13:
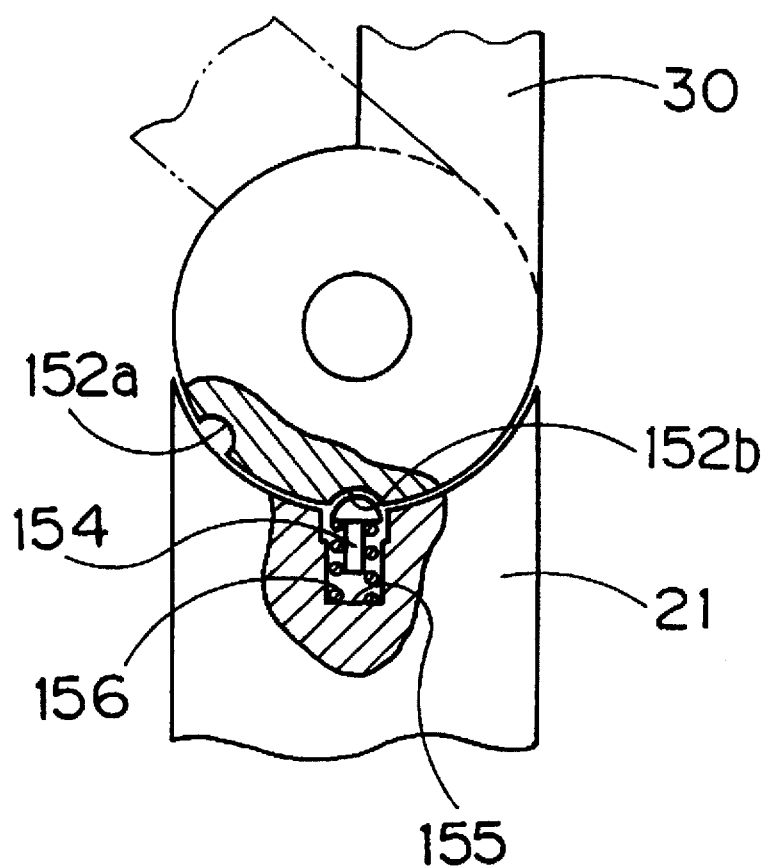
FIG. 13 is a fragmentary, part cross-sectional, frontal view of a first arm portion and a first bail support member according to yet another embodiment of the present invention.

FIG. 13 shows yet another embodiment of the present invention, in which an audible warning mechanism is provided in opposing positions on the first arm portion 21 and the first bail support member 30.

The first bail support member 30 further includes two hemispherical sounding holes 152a and 152b on an outer radial surface thereof. The first arm portion 21 further includes a sounding pin 154, a hole 155, and a spring 156 having a structure identical to the previous embodiments and in a position opposing the radial surface of the first bail support member 30. The tip of the sounding pin 154 is urged toward the first bail support member 30 by means of the spring 156.

When the first bail support member 30 pivots with respect to the first arm portion 21, the sounding pin 154 slides along the radial surface of the first bail support member 30 and drops into either one of the sounding holes 152a or 152b. At this time, the tip of the sounding pin 154 emits an audible sound when it strikes the walls of the sounding holes 152a or 152b, and alerts the user that the bail mode has changed.

Figure 14:
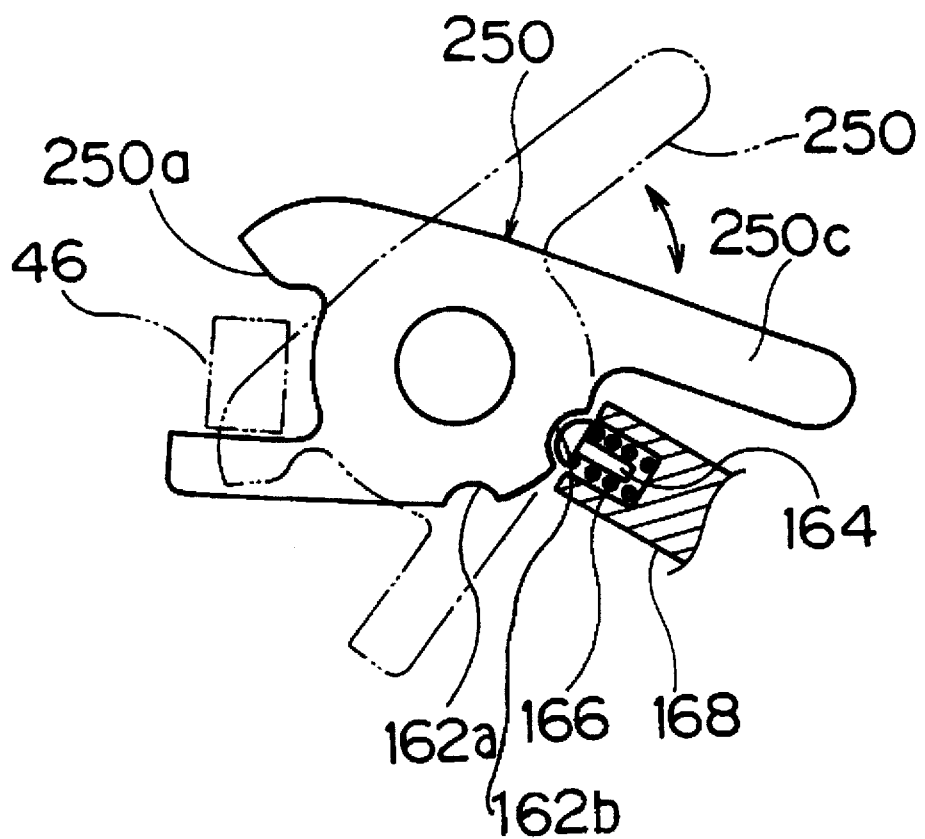
FIG. 14 is a lever for a second toggle spring mechanism according to yet another embodiment of the present invention.

FIG. 14 shows yet another embodiment of the present invention, in which an audible warning mechanism is provided together with a lever 250.

Two sounding holes 162a and 162b are disposed on an outer radial surface of the lever 250. A tubular member 168 is fixed to the wall of rotor 3 and positioned such that it is aligned with the sounding holes 162a and 162b. The tubular member 168 further includes a sounding pin 164 and a second spring 166 partially disposed therein. The sounding pin 164 further includes a hemispherical tip which can engage with either one of the sounding holes 162a or 162b when urged by the second spring 166. When the lever 250 is rotated, the tip of the sounding pin 164 slides along the radial surface of the lever 250, and is urged into either one of the sounding holes 162a or 162b. When this occurs, an audible sound is emitted, thereby alerting the user that the bail mode has changed.

Figure 15:
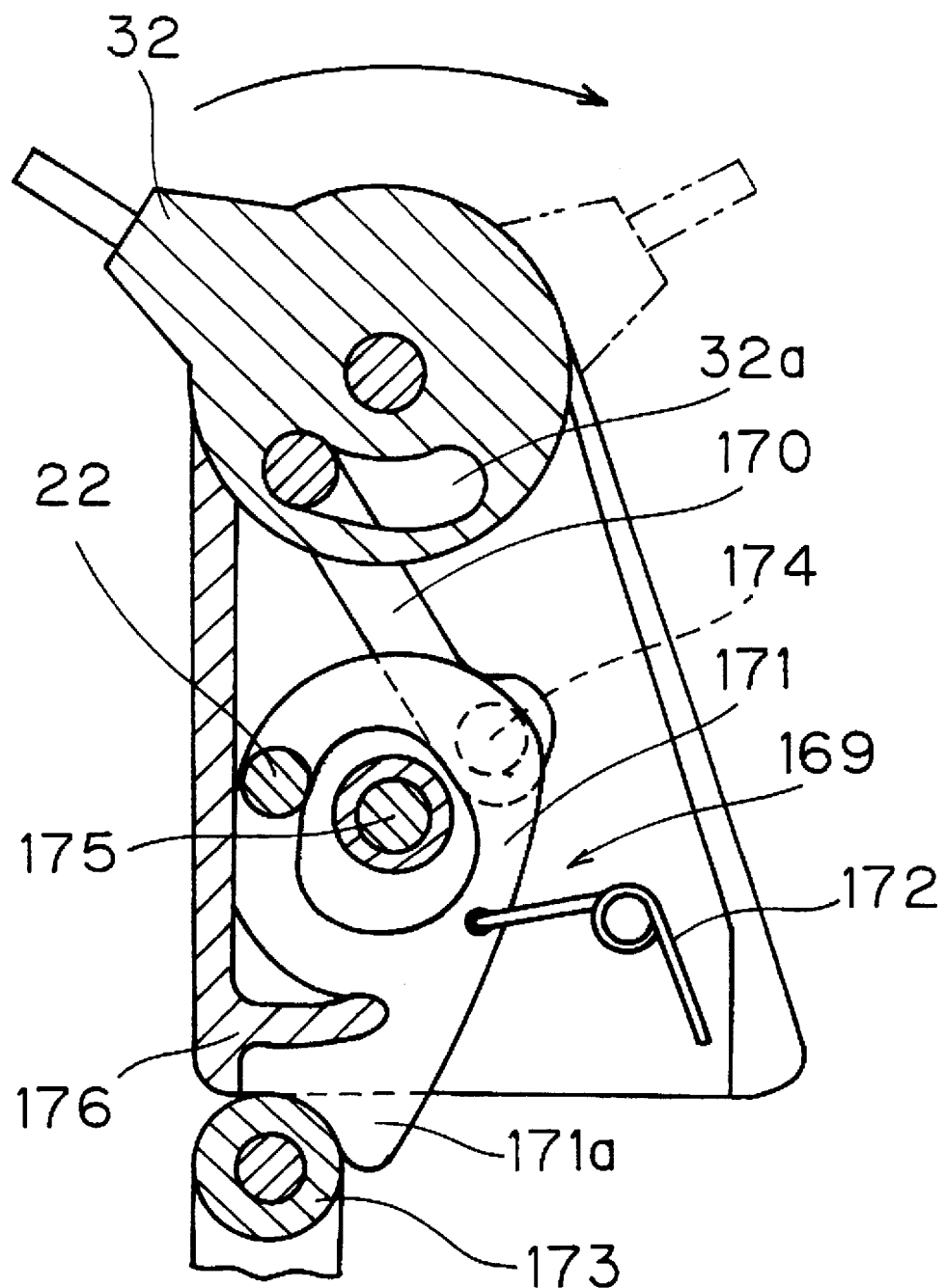
FIG. 15 is a cross-sectional, front view of a second arm portion, a second bail support member and a bail mode switching mechanism according to yet another embodiment of the present invention.

FIG. 15 shows yet another embodiment of the present invention. Here, a portion of an interior of the second bail support member 22 is hollow, and in which a toggle spring mechanism 169 is disposed. The toggle spring mechanism 169 includes a rod 170, a lever 171, and a spring 172. A first end of the rod 170 is engaged with a slot 32a formed in an outer radial portion of the second bail support member 32. A second end of the rod 170 is rotatably fixed to a outer portion of the lever 171.

The lever 171 is generally annular in shape, and an outer portion thereof is rotatably fixed to an inner wall of the second arm portion 22 and pivots around a axis B. The lever 171 is further supported by a post 175, which is fixed to an inner wall of the second arm portion 22 and extends through the annular portion of the lever 171. A first end of a spring 172 is attached to an outer portion of the lever 171, and a second end of the spring 172 is attached to an inner wall of the second arm portion 22. A generally crook-shaped first projection 171a extends from the lever 171, toward a lower portion of the second arm portion 22. A second projection 176 extends from an inner wall of the second arm portion 22 and is engagable with the first projection 171a of the lever 171.

A third projection 173 is fixed to the reel body 2a, and extends to a point just below the lowermost portion of the second arm portion 22.

The operation of this embodiment will now be described.

FIG. 15 shows the bail 33 in the line casting mode. When the rotor 3 is rotated by the user, the first projection 171a will rotate to a point in which it comes into contact with the third projection 173. If sufficient force is applied at this point, the lever 171 will pivot around the axis B and move the rod 170 upward, thereby pushing the second bail support member 32 over to the line reeling mode. When the user shifts the bail 33 over to the line casting mode, this process is reversed. When the bail mode is switched, portions of the lever 171 will strike the inner walls of the second arm portion 22 and the second projection 176. The additional force provided by the spring 172 accelerates the movement of the lever 171 and allows an audible sound to be produced, alerting the user that the bail mode has switched.

It should be noted that the audible warning mechanism described in the above embodiments may be provided on any position or mechanism of the spinning reel. As long as the audible warning mechanism forms part of the switching mechanism and is disposed between positions or modes which change relative to one another, such as the first and second arms 20 and 21 and the first and second bail support members 30 and 31, the audible warning mechanism will operate automatically with the switch-over.

In addition, the positioning of the active member and the passive member in the audible warning mechanism, as well as structural considerations such as whether to position the urging mechanism on the active member or the passive member, may be varied in ways other than those shown in the preceding embodiments.

Further, it is possible to provide a mechanism which resonates with and amplifies the sound generated by the audible warning mechanism. For example, a highly resonant material can be provided on the sound emitting part, a structure can be created which more easily transmits the sound externally, or a resonant space can be provided within the spinning reel.

In the embodiments shown in FIGS. 5 and 7, the durability of the second toggle spring mechanism 41 can be improved by extending the length of second rod 51 and second spring 53.

In the embodiment shown in FIG. 7, if a rotational center of the second tubular member 52 is positioned closer to the rotational center of the lever 150, the angle of rotation of the second tubular member 52 is increased and thereby increases the stability of the pivoting operation and extends the life of second spring 53. Further, if the hole 150b on the lever 150 is replaced with a notch groove for engaging with the second spring 51, the narrow portion on the outside of the hole 50b can be removed, thereby both reducing the incidence of defects and reducing the weight of the lever 150.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed:

1. A spinning reel comprising:
  a rotor rotatably supported on a spinning reel main body, said rotor including first and second arm portions;
  first and second bail support members pivotably supported at an end of each of said first and second arm portions;
  a bail fixed to both said first and second bail support members; and
  a bail mode switching device for switching said bail into a line reeling mode and a line casting mode, said bail mode switching device including a first toggle mechanism disposed in an inner portion of said first arm portion and including a first spring member for biasing said first toggle mechanism between a first and a second position, a second toggle mechanism disposed on said rotor and including a lever and a second spring member for biasing said second toggle mechanism between a first and a second position, and a switching member disposed on said spinning reel main body;
  wherein said second toggle mechanism moves said bail into said line reeling mode when said switching member contacts said lever; and
  a distinct audible sound is generated when a bail mode change has been completed, the distinct audible sound created by contact between said first toggle mechanism and said second toggle mechanism.

2. The spinning reel according to claim 1, wherein said first toggle mechanism further includes a first tubular member, and a rod disposed in said first tubular member and biased outward therefrom by said first spring member, one end of said rod connected to said first bail support member.

3. The spinning reel according to claim 1, wherein said second toggle mechanism further includes a second tubular member, and a rod disposed in said second tubular member and biased outward therefrom by said second spring member, one end of said rod connected to said second toggle mechanism.

4. The spinning reel according to claim 3, wherein said second toggle mechanism is pivotably supported on said rotor by a pin, and further includes a groove formed in a lower side thereof engagable with said pin, wherein said pin slides in said groove when a bail mode change has been completed.

5. The spinning reel according to claim 1, wherein said second toggle mechanism further includes a plurality of sounding holes formed thereon, and a second tubular member supported on said rotor, said second spring member and a sounding pin disposed in said second tubular member, wherein said sounding pin is biased outward from said second tubular member by said second spring member and is engagable with each of said sounding holes.

6. The spinning reel according to claim 1, wherein said first toggle mechanism further includes a third spring member, a sounding pin, and a plurality of sounding holes, wherein said third spring member biases said sounding pin into said sounding holes when said bail mode change has been completed.

7. The spinning reel according to claim 1, wherein said first toggle mechanism further includes a leaf spring said leaf spring is displaced by said first toggle mechanism during said bail mode change, and said leaf spring creates an audible sound when said bail mode change has been completed.

8. A spinning reel comprising:

a rotor rotatably supported on a spinning reel main body, said rotor including first and second arm portions;

first and second bail support members pivotably supported at an end of each of said first and second arm portions;

a bail fixed to both said first and second bail support members;

a bail mode switch mechanism for switching said bail into a line reeling mode and a line casting mode, said bail mode switch mechanism including a toggle mechanism which urges said bail to change modes when said bail is pivoted to an intermediate position, and an audible warning mechanism which produces a distinct audible sound in response to contact with said toggle mechanism when a bail mode change has been completed.

9. A spinning reel comprising:

a rotor rotatably supported on a spinning reel main body, said rotor including first and second arm portions;

first and second bail support members pivotably supported at an end of each of said first and second arm portions;

a bail fixed to both said first and second bail support members;

a bail mode switch mechanism for switching said bail into a line reeling mode and a line casting mode, said bail mode switch mechanism including a first toggle mechanism which includes a first tubular member, and a second toggle mechanism which includes a notch which engages with said first tubular member;

wherein said first tubular member and said notch strike each other and create an audible sound when a bail mode change has been completed.

* * * * *

UNITED STATES PATENT AND TRADEMARK OFFICE
CERTIFICATE OF CORRECTION

PATENT : 5,683,049

DATED : November 4, 1997

INVENTOR(S) : Yuzo Kawabe

It is certified that error appears in the above-identified patent and that said Letters Patent is hereby corrected as shown below:

On the title page, item [75] inventors: the second inventor should be corrected to read as follows:

--Yasuhiro Hitomi--.

Signed and Sealed this

First Day of December, 1998

Attest:

BRUCE LEHMAN

Attesting Officer

Commissioner of Patents and Trademarks